Figure 1:
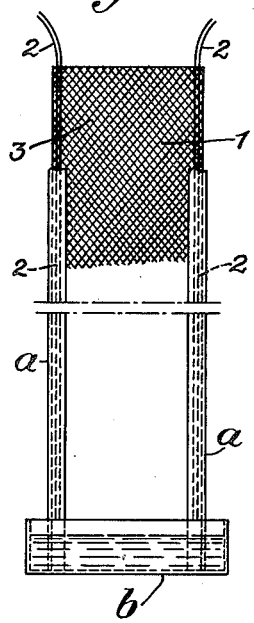

Aug. 27, 1935.  E. GATTI  2,012,384
DEVICE FOR ATTRACTING AND EXTERMINATING VERMIN
Filed Aug. 13, 1934

E. Gatti
INVENTOR

Patented Aug. 27, 1935

2,012,384

UNITED STATES PATENT OFFICE 2,012,384

DEVICE FOR ATTRACTING AND EXTERMINATING VERMIN

Ernst Gatti, Zurich, Switzerland

Application August 13, 1934, Serial No. 739,655
In Switzerland August 23, 1933

9 Claims. (Cl. 43—112)

There are known devices for attracting and exterminating vermin in which the vermin are attracted by means of an odoriferous medium applied to the device and are killed by means of an incandescent wire winding of a resistance element, for example of a heating resistance. There are also known devices in which freely stretched bare live wires are disposed at some distance apart, so that the vermin are killed by the electric current on making contact.

These known devices are open to the objection that the corpses of the vermin are charred, resulting in an unpleasant odor, so that such devices are unsuitable for household use. Further, the use of such devices involves fire risks, as the incandescent corpses fall on the floor or are suspended in the air for some considerable time as sparks which may come in contact with and set fire to inflammable materials.

Now, the subject of this invention is a device for attracting and exterminating vermin, whereby the aforesaid objections are avoided and odorless extermination of the vermin is effected without incurring any risk of fire.

This device is adapted for use in households, in stables, and, when electric energy is available, for installation in marshy districts, along water courses, and especially in districts plagued with mosquitoes, as in the tropics.

The device so constituted can be used for the extermination of ants, mice, snakes and like vermin. It can also be used under water and thus serve for the extermination of sub-aqueous vermin, such as larvæ, etc.

According to the invention there is interposed between two poles of a source of current a surface forming a field of electrical difference of potential and consisting preferably of vegetable, animal, mineral or artificially produced materials, which surface is treated with an electrolyte-forming liquid attractive to vermin.

With the described arrangement an electric current traverses the surface connecting the two poles in such wise that the entire surface presents a field of strain. When now a small animal, for example a fly, contacts this surface with its legs, in consequence of the moisture there is effected good conducting contact with the body of the animal, the feet of which bridge a part of the field of strain between the two poles, with the result that a current traverses the body of the animal, bringing about phenomenon of paralysis, so that the animal is unable to move away from the said surface by its own efforts. It will be understood that the current flowing through the body of the animal will be the greater, the greater the distance bridged by the legs of the animal, and that naturally for animals of very small dimensions there may be used higher voltages than for animals which would bridge widely spaced points of the field of electrical strain. Naturally, also, the choice of voltage and quantity of current will depend on the nature of the vermin to be exterminated. The animals, which adhere to the field of strain in consequence of the phenomenon of paralysis and which are subjected to the current flowing continuously through their bodies, are exterminated without combustion.

Figure 3:
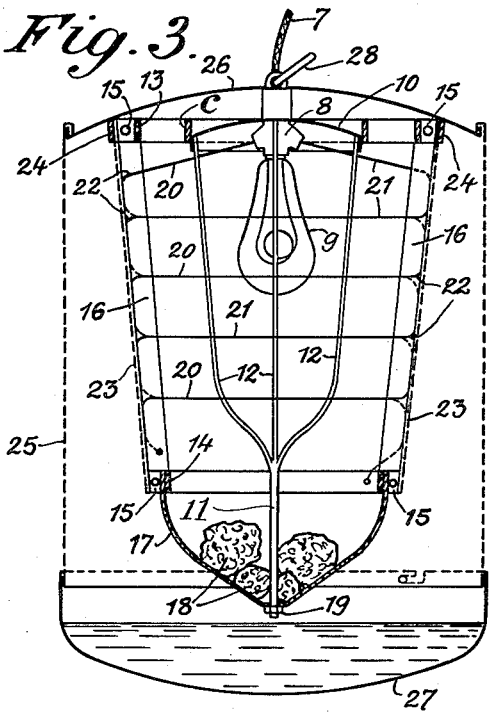
Figure 2:
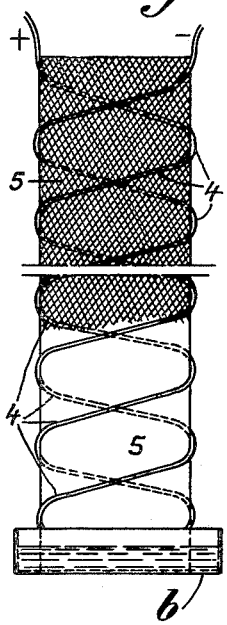
Figure 4:
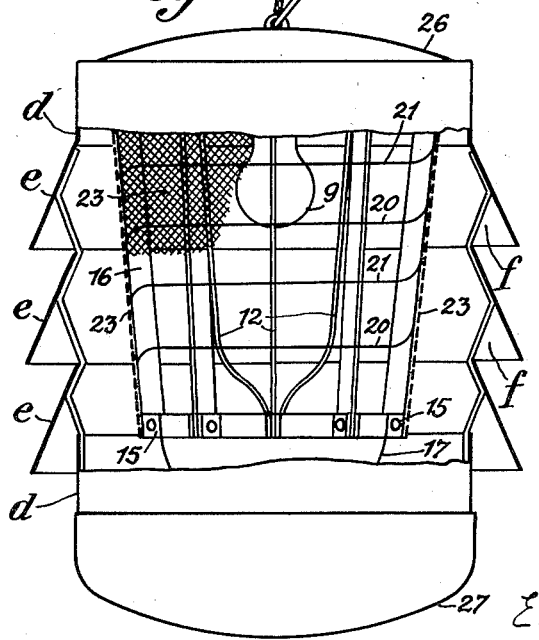

Several embodiments of the invention are illustrated diagrammatically by way of example in the accompanying drawing in which Figs. 1 and 2 are elevations showing, respectively, a first and a second embodiment. Fig. 3 is a vertical section showing a third embodiment. Fig. 4 is an elevation showing a fourth embodiment.

In the embodiment illustrated in Fig. 1 there are secured, for example by stitching, along the edges of a strip of fabric or wick I well impregnated with current-conducting liquid, wires 2 connectible to a source of current. The surface 3 presented by the impregnated fabric interposed between the conductors or electrodes 2 constitutes a field of electrical difference of potential or of strain, variable with the strength of the current, distance apart of the conductors and composition of the impregnating liquid or electrolyte.

For the impregnating liquid there may be used hydrochloric or sulphuric acid diluted with water or oil, and to attract the vermin there may be admixed therewith musk oil or ether. Vermin such as mosquitoes, flies, and other insects, ants or small water animals which come in contact with the field of strain adhere to the fabric and are destroyed in a short time.

$a$ denotes channeled binding strips of non-conducting material and $b$ a vessel to receive the impregnating liquid.

In Fig. 2 is illustrated a field of strain set up by alternating current. The spiral windings 4 formed alternately by the negative and positive conductors extend over the entire breadth of the field, their distance apart depending on the strength of current used and the composition of the electrolyte. The action on the vermin is the same as described in connection with the example illustrated in Fig. 1. $b$ denotes the receptacle for the impregnating liquid.

With suitable choice of dimensions and of tincture the devices illustrated in Figs. 1 and 2 may be supported on the floor or suspended. The device if supported on the floor may be used to attract and exterminate ants, locusts, beetles and the like; if arranged near water it may be used for exterminating snails, reptiles and other water animals; if suspended it may be used to exterminate mosquitoes and gnats, flies, spiders and the like.

The embodiment illustrated in Fig. 3 is adapted to be suspended. To a lamp socket 8 connectible by a cable 7 with a source of current is screwed a branch member 8 which forms a support for a bulb 9. The socket 8 also carries an insulated disc 10 provided with a flanged rim secured to which are three arms or branches 12 merging into a bar 11 serving to carry a basket-like structure of insulating material comprising a wide upper ring 13 and a lower ring 14 of smaller diameter. Both rings are provided with equispaced pairs of lugs 15 to which stays 16 are secured by means of screws. c denotes a ring arranged concentrically with the ring 13 and serving to guide the disc 10. The base of the basket-like structure is constituted by a cup 17 serving to contain a liquid that attracts vermin or to contain sponge material 18 impregnated with such liquid. The bar 11 is screw-threaded at its lower end for engagement by a nut 19 serving to support the basket-like structure. To the branch member 8 are connected conductors 20 and 21 of different polarity traversed by alternating current and constituting parallel horizontal windings joining the stays of the basket-like structure which are provided with channels 22 serving as guides for the conductors. The basket-like structure is enveloped by an impregnated fabric 23. A strip 24 of fabric operating after the fashion of a wick is secured to the upper seam of the fabric envelope and serves to take up slowly and uniformly the electrolyte-forming liquid which is distributed over the field of strain presented by the surface of the fabric envelope. The structure above described is enclosed in a cage 25 of lattice-work or netting of such size of mesh as to permit the passage of insects attracted by the odor, which cage is suspended from the peripheral flange of a lid 26 serving to cover the basket-like structure and which serves to conceal the surface of the envelope to which adhere the corpses of the vermin. To the lower edge of the cage is secured, so as to be readily detachable, a dish of glass 27, for example, for receiving a suitable liquid e. g., water. By means of a supporting ring 28 the device can be suspended from a hook or the like. The fabric serving to envelope the basket-like structure is preferably silk, which is chosen because of its capacity for absorbing moisture from the air and therefore remaining moist for a long time with the impregnating liquid. In lieu of silk, other vegetable or animal fabric may be used; also paper or parchment may be used in lieu of silk.

As an impregnating liquid there may be used hydrochloric and/or sulphuric acid diluted with oil or water and serving as a conductor. Musk oil is preferably admixed with the acid liquid so as to attract the vermin. It suffices to impregnate the fabric envelope with the tincture from time to time and to warm it in order that it may retain its capillary properties and remain properly moist.

As in the embodiments illustrated in Figs. 1 and 2, the mixture constituting the electrolyte will be selected in dependence on the strength of the current traversing the conductors. The higher the voltage the further apart the conductor windings may be spaced; the lower the voltage, the less will the conductors be spaced apart.

The tinctures prepared according to the above directions are not liable to dry, in view of their hygroscopic properties, so that fabric impregnated with such a tincture remains permanently operative as an electrolyte, the efficacy of which depends on the choice of fabric.

The impregnating liquid serves to attract vermin which pass through the lattice-work or netting to the fabric envelope, cling to the latter and finally fall dead into the dish 27. At night the attraction is enhanced by the lamp 9 which is switched on, the heat given off by the lamp acting on the tincture absorbed by the fabric strip 24 and rendering it more fluid.

For the purpose of emptying and cleaning the device, the dish 27 is removed and the nut 19 loosened, whereupon the basket-like structure may be removed.

Fig. 4 shows a device in which, in lieu of a cage 25 of lattice-work, there is provided an outer shell d with overlapping rings e arranged after the fashion of Venetian blinds. Animals attracted by the odor pass through the gaps f into the interior of the structure and so to the field of strain.

If the surface presenting the field of strain is very large, in order to obtain the requisite rigidity, glass, asbestos slate or the like may be provided as a backing for the fabric; or in lieu of fabric the field may be constituted by glass, asbestos, cellulose or the like coated with a suitable liquid serving as an electrolyte.

As is understood, the device described may be connected to a net-work fed with direct current.

The invention is not limited to the particular forms described.

Glycerine is a liquid having in a high degree hygroscopic properties and it does not dry and, when mixed with the liquid serving as a conductor for electric current, maintains a field of strain, formed by the web permanently humid and effective.

Also a mixture of glycerine with alum or borax may be used. The web may be impregnated with one of these tinctures or the said means may be applied in powdered condition to the back of the web, the front of which may be spread with glycerine, the means dissolving in the glycerine. Also a mixture of alum with borax or carbonic natron may be used to impregnate the web.

Using such tinctures, rewetting of the web is not necessary, since such tinctures do not dry in, provided that the web itself consists of a well moisture aborbing material, i. e. silk. The effect is permanent and uniform, so that no service is required.

What I claim is:—

1. A device for attracting and exterminating vermin, comprising a web connected to the two poles of a source of current and impregnated with liquid which serves as a conductor for electric current.

2. A device for attracting and exterminating vermin, comprising a web connected to the two poles of a source of current and impregnated with liquid which serves as a conductor for electric current, the web being stretched over a hollow rigid structure of non-conducting material, and electrodes disposed as parallel windings in alternating relation being incorporated in the web.

3. A device for attracting and exterminating vermin, comprising a web connected to the two poles of a source of current and impregnated with liquid which serves as a conductor for electric current, the web being stretched over a hollow rigid structure of non-conducting material, electrodes disposed as parallel windings in alternating relation being incorporated in the web, the said hollow rigid structure being adapted to be hung and having a receptacle for an attracting means, and an electric lamp being disposed in the said structure, this lamp being enclosed in a grid, to which a receptacle for a liquid is hung.

4. A device for attracting and exterminating vermin, comprising a web connected to the two poles of a source of current and impregnated with liquid which serves as a conductor for electric current, the web being stretched over a hollow rigid structure of non-conducting material, and electrodes disposed as parallel windings in alternating relation being incorporated in the web, the said device comprising further a fabric strip arranged at the upper seam of the said web impregnated with the electrolytic liquid, to keep moist the web impregnated with current-conducting liquid.

5. A device for attracting and exterminating vermin, comprising a web connected to the two poles of a source of current and impregnated with liquid which serves as a conductor for electric current, the impregnated web consisting of silk.

6. A device for attracting and exterminating vermin, comprising a web connected to the two poles of a source of current and impregnated with liquid which serves as a conductor for electric current, said liquid being mixed with a second liquid which is non-drying due to its hygroscopic properties.

7. A device for attracting and exterminating vermin, comprising a web connected to the two poles of a source of current and impregnated with liquid which serves as a conductor for electric current, the impregnated web consisting of silk, the said liquid being mixed with a second liquid which is non-drying due to its hygroscopic properties, the second liquid consisting of glycerine.

8. A device for attracting and exterminating vermin, comprising a web connected to the two poles of a source of current and impregnated with liquid which serves as a conductor for electric current, the impregnated web consisting of silk, the said liquid being mixed with a second liquid which is non-drying due to its hygroscopic properties, the second liquid consisting of a mixture of glycerine and borax.

9. A device for attracting and exterminating vermin, comprising a web connected to the two poles of a source of current and impregnated with liquid which serves as a conductor for electric current, the impregnated web consisting of silk, the said liquid being mixed with a second liquid which is non-drying due to its hygroscopic properties, the second liquid consisting of a mixture of glycerine and alum.

ERNST GATTI.